US010008215B1

United States Patent
LaClair et al.

(10) Patent No.: US 10,008,215 B1
(45) Date of Patent: Jun. 26, 2018

(54) SYSTEMS AND METHODS FOR DIGITAL CONTENT RECORDING

(71) Applicant: UIPCO, LLC, San Antonio, TX (US)

(72) Inventors: Bruce Fushey LaClair, San Antonio, TX (US); Justin Dale Sekula, Falls City, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days. days.

(21) Appl. No.: 15/364,823

(22) Filed: Nov. 30, 2016

(51) Int. Cl.
*G10L 19/16* (2013.01)
*G10L 19/002* (2013.01)
*H04W 88/02* (2009.01)

(52) U.S. Cl.
CPC .......... *G10L 19/167* (2013.01); *G10L 19/002* (2013.01); *H04W 88/02* (2013.01)

(58) Field of Classification Search
CPC ..... G10L 19/167; G10L 19/002; H04W 88/02
See application file for complete search history.

(56) References Cited

U.S. PATENT DOCUMENTS

2011/0314235 A1* 12/2011 Kwon ................... G06F 3/0608
711/154
2014/0280400 A1* 9/2014 Legay ............... G06F 17/30194
707/827

* cited by examiner

*Primary Examiner* — Angela A Armstrong
(74) *Attorney, Agent, or Firm* — Fletcher Yoder, P.C.

(57) ABSTRACT

Systems and methods for capturing and/or storing audio content are provided. A content queue stores a first portion of the audio content in a first buffer. The first portion of the content is codec-encoded. While codec-encoding the first portion, the content queue stores a second portion of the content in a second buffer. After codec-encoding of the first portion is complete, the second portion is codec-encoded. While codec-encoding the second portion, a third portion of the audio content is stored in a buffer other than the second buffer.

19 Claims, 4 Drawing Sheets

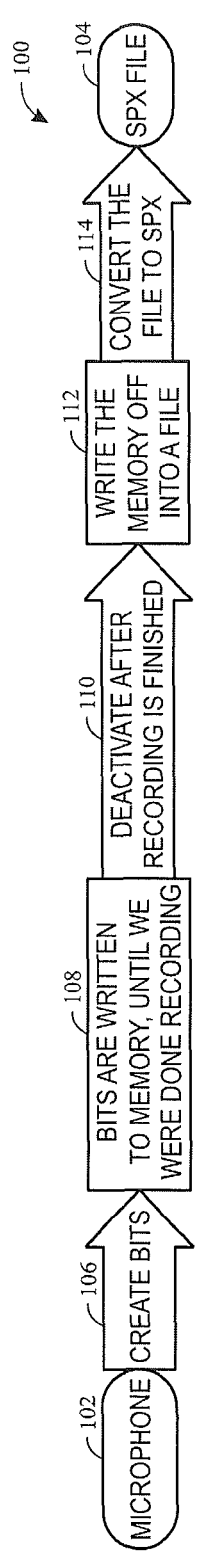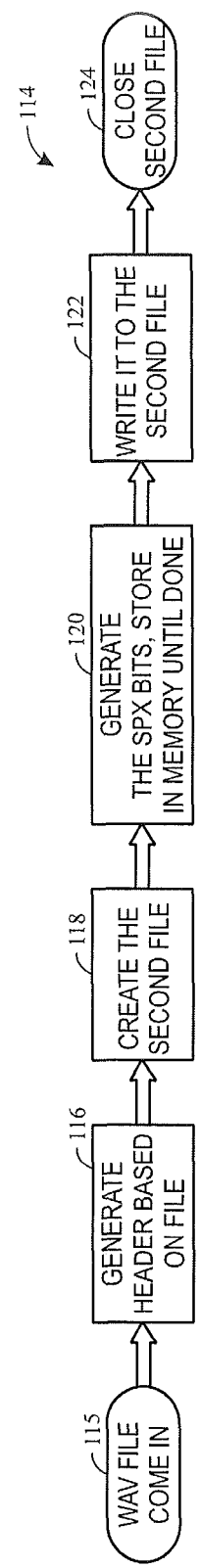

SYSTEMS AND METHODS FOR DIGITAL CONTENT RECORDING

BACKGROUND

The present disclosure relates generally to systems and methods for capturing and encoding audible data. More specifically, the present disclosure relates to streamed encoding of audible data in a manner that reduces a digital storage footprint as well as reduces post-processing activities associated with content encoding.

Digital capture devices may capture content for subsequent conversion into a stored representation that may be accessed and played back. For example, microphones receive audible inputs, transforming the audible inputs into electrical impulses that may be interpreted by electronic devices. For example, digital microphones may convert audible inputs into a digital representation of 1's and 0's, which may be stored in digital storage devices for subsequent retrieval, reproduction, and playback of the audible inputs. Unfortunately, a limited amount of space may be available for storing these digital representations. This may be especially true for multi-purpose devices, such as tablet computers, cellular telephones, etc., which may utilize digital storage for other functionalities as well.

Codecs, hardware devices and/or software that encode captured content into stored representations and/or decode the stored representations, may reduce an amount of digital storage space consumed by stored representations. However, codecs oftentimes require a significant amount of processing time and storage during encoding, especially for longer recordings.

The limited availability of storage and long post-processing times for encoding audible inputs may be problematic. Certain electronic devices may only support encoding of an inadequate amount of audible data. For example, investigators, during an audit or investigation, may desire to record a significant amount of audio and/or video data. Unfortunately, current codec technologies may only support recording of a significantly less than desirable amount of content. In many instances, this may be a result of the internal encoding process of the codec. Delays during recoding can result in loss of information and unsuccessful investigations.

DRAWINGS

These and other features, aspects, and advantages of the present disclosure will become better understood when the following detailed description is read with reference to the accompanying drawings in which like characters represent like parts throughout the drawings, wherein:

FIG. 1A is a flowchart that illustrates a process for encoding audible inputs into an encoded digital file, in accordance with embodiments described herein;

FIG. 1B is a flowchart illustrating details of the conversion process into the encoded file of FIG. 1A, in accordance with an embodiment;

DETAILED DESCRIPTION

Figure 2:
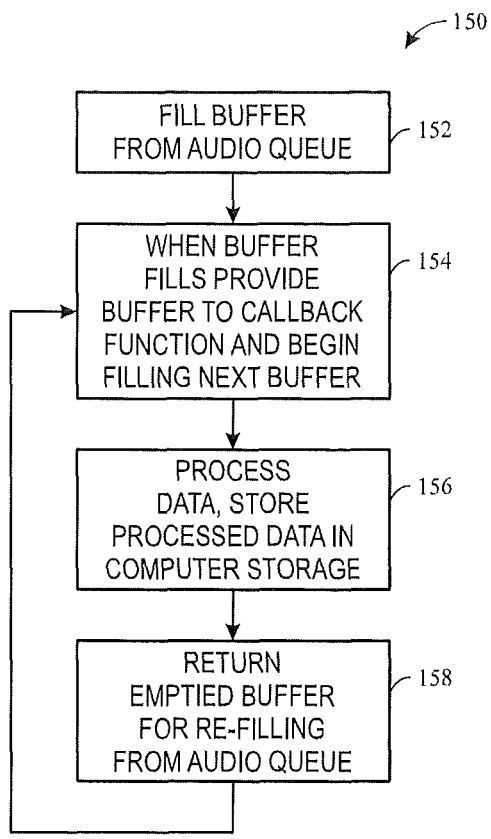
FIG. 2 is a flowchart that illustrates a process for buffered encoding implemented during the process of FIG. 1, in accordance with embodiments described herein.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are directed toward systems and methods for efficient encoding of captured content. The systems and methods provided herein increase a supported recording amount of content and transformation of audio or video into efficiently stored data. The systems and methods use a piecemeal approach of content encoding, resulting in reduced storage use during encoding as well as reducing an amount of post-processing of the codec's encoding process. The encoding process may be implemented in a buffered-encryption manner, resulting in less utilization of storage resources and reduces post-processing activities, as will be discussed in more detail below.

With the foregoing in mind, FIG. 1A is a flowchart that illustrates a process 100 for encoding content received from a content capture device (e.g., a camera or microphone 102) into a codec-encoded file 104, in accordance with embodiments described herein. While the current discussion discusses capture of audible inputs via the microphone 102, the discussion is not intended to be limited to such embodiments. Indeed, as mentioned above, many different types of content and content capture devices, such as video content captured by a video camera, etc. may be processed using the embodiments provided herein.

As recording via the microphone 102 is activated, the process 100 begins with the microphone 102 capturing audible inputs via hardware of the microphone 102. The microphone 102 may generate electronic impulses representative of the audible inputs. For example, bits representative of the audible inputs may be generated (arrow 106), based upon the audible inputs captured by the microphone 102.

The created bits are then written to memory until recording via the microphone 102 is deactivated (blocks 108 and 110). Thus, a significant amount of codec un-encoded bit data may be stored in memory, prior to encoding of the data by the codec.

This codec un-encoded bit data may be written from memory into a codec-un-encoded file (block 112). For example, the bits may be stored in a waveform audio file (WAVE or WAV) format. This file may be then be converted to a codec-encoded file (arrow 114). For example, when the encoding codec is the Speex codec, an open-source audio compression codec designed for speech, the codec-encoded file 104 may include an SPX file, as illustrated in FIG. 1A.

Turning to a more-detailed discussion of the process for converting to the codec-encoded file 104, FIG. 1B is a flowchart illustrating an embodiment of the conversion process 114 of FIG. 1A for converting the codec-un-encoded file 115 (e.g., a WAV file) into the encoded file of FIG. 1A, in accordance with an embodiment. The process 114 begins with generating (block 116) a header based upon the codecun-encoded file 115. The header may include codec-defined attributes regarding, for example, compression, etc.

A base codec file is created (block 118) with the header information from block 116. The base codec file will store the codec-encoded bits, as discussed below.

Once the base codec file is created in block 118, bits of the codec-encoded file 104 are generated (block 120). For example, when an Speex coded is used, spx bits are generated for the entire codec-un-encoded file 115 (e.g., a WAV file). These bits of the codec-encoded file 104 are stored in memory until the entire codec-un-encoded file 115 is converted into bits of the codec-encoded file 104.

Once the entire codec-un-encoded file 115 is converted into bits of the codec-encoded file, the bits are written (block 122) to the base codec file. Once the writing is complete, the base file is closed (block 124), resulting in the codec-encoded file 104.

As may be appreciated, a significant amount of memory and storage may be consumed during blocks/arrows 106-114. For example, significant electronic device memory may be consumed as the bits continue to be created (arrow 106). Further, as a significant number of bits are created, the number of bits written to a file in storage may increase.

Accordingly, rather than beginning the codec encoding process after content capture is complete, the current systems and methods, in some embodiments, may provide a more piecemeal encoding of data, encoding a subset of bits in parallel with the capture of new bits. This parallel encoding and capture may result in an alleviation of memory consumption, relative to the embodiments of FIGS. 1A and 1B.

FIG. 2 is a flowchart that illustrates a process 150 for buffered encoding implemented during the process of FIG. 1, in accordance with an embodiment described herein. In the process 150 embodied in FIG. 2, an audio queue, which includes two or more buffers, receives content captured and provided by a content capture device (e.g., the microphone 102 of FIG. 1A). As illustrated, a first buffer of an audio queue of bits created by a content capture device is filled (block 152).

When the buffer is full, the buffer is provided (block 154) as an input to a callback function. The bits of the captured content are directed to an additional buffer, which begins to fill.

As the additional buffer fills, the callback function may process (block 156) the data provided in first buffer, resulting in an emptied buffer. For example, the callback function may convert the codec-un-encoded bits into codec-encoded bits and store the coded-encoded bits into computer storage.

The emptied buffer resulting from block 156 is returned (block 158) to the audio queue for re-filling. Thus, the filling of the audio queue may continue to receive content bits and fill buffers without exhausting memory. The process 150 continues until content capture is disabled.

Figure 3:
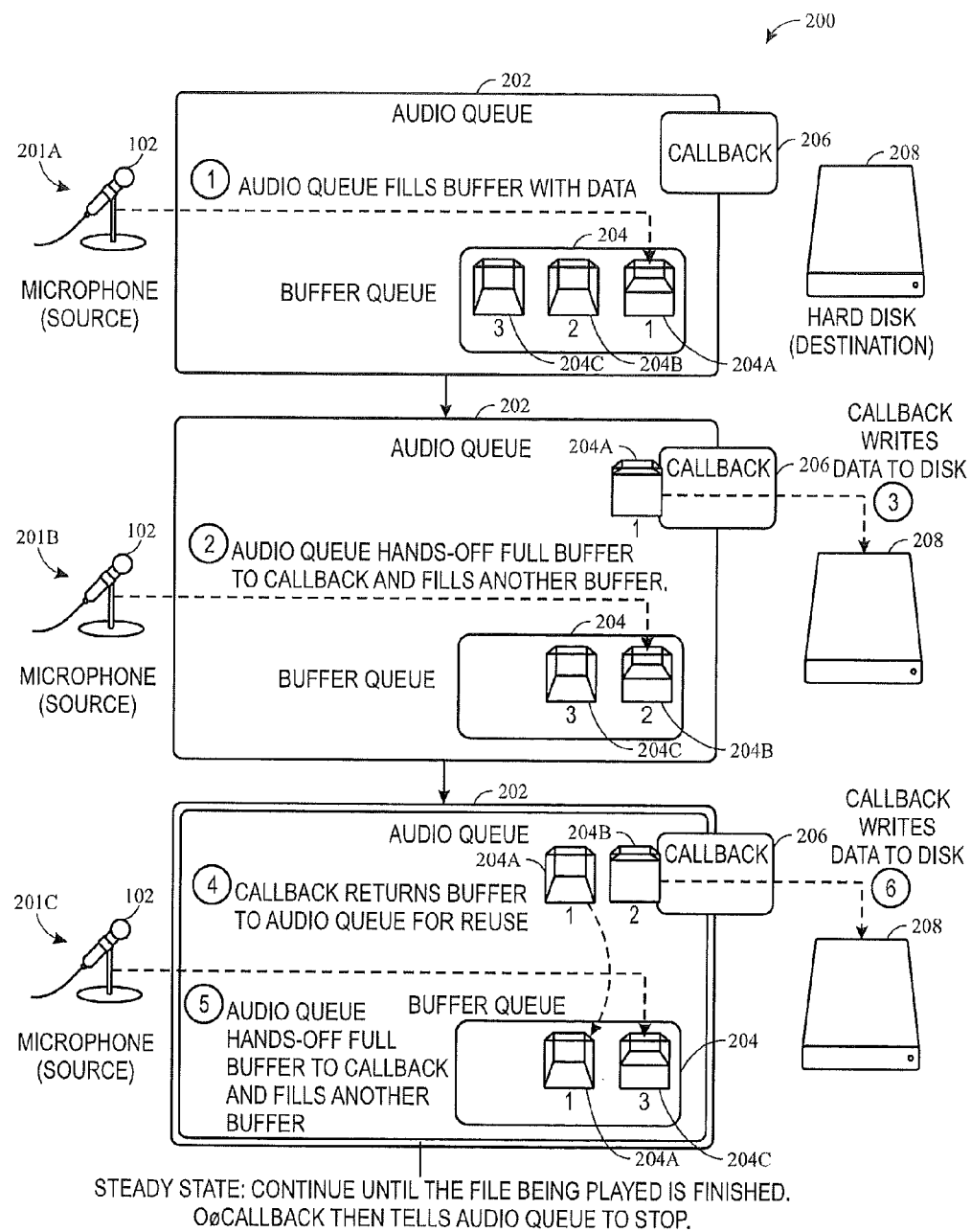
FIG. 3 is a schematic diagram that illustrates details of the processes of FIGS. 1 and 2, in accordance with embodiments described herein.

FIG. 3 is a schematic diagram 200 that illustrates the processes 100 and 114 of FIGS. 1A and 1B as modified by the process 150 of FIG. 2, in accordance with an embodiment. As mentioned above, in a first progression step 201A, an audio queue 202 is created with a buffer queue 204 having two or more buffers (e.g., 204A, 204B, and 204C). The first buffer 204A of the buffer queue 204 is filled with data provided by the content capture device (e.g., microphone 102).

In a second progression step 201B, when the first buffer 204A is full, the audio queue 202 hands-off the first buffer 204A to a callback function 206. The callback function 206 converts the bits in the first buffer 204A into codec-encoded bits and writes the converted codec-encoded bits to disk 208. Additionally, captured content begins to fill a second buffer 204B.

In a third progression step 201C, when the first buffer 204A is emptied (e.g., by the callback function 206 completing the conversion of the bits in the first buffer 204A), the callback function 206 returns the first buffer 204A to the buffer queue for re-filling. Further, when the second buffer 204B is filled, the second buffer 204B is provided to the callback function 206 for processing. The callback function 206 begins codec-encoding the buffer 204B and writes the converted bits to the disk 208.

This process continues until completion of the content capture. For example, when buffer 204C is filled, buffer 204C is provided to callback function 206 and is processed and written to disk 208. Once the last bits of data representing the content captured by the content capture device are processed by the callback function 206, the data written to the disk represents the codec-encoded file 104.

While the embodiment illustrated in FIG. 3 includes three buffers 204A, 204B, and 204C, any number of buffers may be provided in the buffer queue 204. Further, the buffer size may also vary. The number of buffers and the buffer size may be set such that the buffer queue 204 maintains at least a portion of one empty buffer for content storage, while the callback function processes data in a buffer. To reduce memory utilization, the buffer size may be relatively low. For example, for a 1 GB audio file, the buffer size may be approximately 600 kB. Further, in some embodiments, there may be three buffers, to ensure that there is at least one empty buffer, one buffer that is being filled, and one buffer that is being converted into the codec-encoded file.

Figure 4:
FIG. 4 is a flowchart illustrating details of the callback functionality of FIG. 3, in accordance with embodiments described herein.

FIG. 4 is a flowchart illustrating details of the callback function 206 of FIG. 3, in accordance with embodiments described herein. As mentioned above, buffers of raw bits (codec-un-encoded bits) are provided to the callback functionality, where they are received (block 250). When the initial raw bits are received, a header is generated (arrow 252) based upon the settings. As mentioned above, the header may include information dictated by the codec. For example, the header may specify the sample rate, channels per frame, format size, etc. A temporary storage location of the bits is created (block 254). The bits are compressed (block 256) in accordance with the settings in the header. For example, lossy compression may be implemented on the bits, in accordance with the Speex codec.

The compressed bits are written (arrow 258) to a page of memory. As may be appreciated, a page of memory is a fixed-length contiguous block of virtual memory. When the page is determined to be full (block 260), the codec-encoded bits are written (block 262) to the codec base file. For example, when the Speex codec is used, SPX encoded bits are written to the page of memory and eventually written to the base file.

As may be appreciated, the current techniques may result in increase efficiencies in generating codec-encoded content. For example, by processing the raw data in portions rather than as a whole, only portions of the raw data and/or the converted data needs to be stored in the memory of the electronic device performing the codec encoding. Accordingly, memory utilization during the codec encoding process may be reduced.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. An electronic device for storing content, comprising:
   computer storage for storing codec-encoded content;
   a content queue, comprising:
      a buffer queue comprising two or more buffers, each of the two or more buffers configured to store a portion of raw bits of the content; and
      a callback function, configured to perform codec-encoding of raw bits of the content stored in one of the two or more buffers into codec-encoded portions of the content and write the codec-encoded portions of the content to the computer storage;
   a processor configured to manage the content queue, the content queue configured to:
      store a first portion of the raw bits of the content in a first buffer;
      when the first buffer is full, provide the first buffer as input to the callback function;
      upon receiving the first buffer at the callback function, codec-encode, via the callback function, the first portion of the raw bits of the content into a first portion of codec-encoded bits of the codec-encoded content;
      while codec-encoding the first portion of raw bits of the content, store a second portion of the raw bits of the content in a second buffer;
      when the second buffer is full, provide the second buffer as input to the callback function;
      upon receiving the second at the callback function, and after codec-encoding the first portion of raw bits of the content, codec-encode the second portion of the raw bits of the content into a second portion of codec-encoded bits of the codec-encoded content;
      while codec-encoding the second portion of the raw bits of the content, store a third portion of the raw bits of the content in a buffer other than the second buffer; and
      upon completion of the codec-encoding of the second portion of the raw bits of the content, append the second portion of the codec-encoded bits of the codec-encoded content to the first portion of the codec-encoded bits of the codec-encoded content.

2. The electronic device of claim 1, comprising:
   a content capture device configured to:
      capture the content;
      provide the first portion of the raw bits of the content to the first buffer for storage; and
      provide the second portion of the raw bits of the content to the second buffer for storage.

3. The electronic device of claim 2, wherein the content capture device is configured to provide the first portion of the raw bits of the content to the first buffer and provide the second portion of the raw bits of the content to the second buffer by:
   providing the first portion of the raw bits of the content and the second portion of the raw bits of the content to the buffer queue.

4. The electronic device of claim 1, wherein the callback function is configured to:
   when the codec-encoding of the first portion of the raw bits of the content is complete, return the first buffer to a buffer queue of the content queue; and
   when the codec-encoding of the second portion of the raw bits of the content is complete, return the second buffer to the content queue.

5. The electronic device of claim 1, wherein the callback function is configured to:
   generate a header based upon one or more compression settings of the codec-encoding; and
   compress the raw bits based upon the one or more compression settings.

6. The electronic device of claim 5, wherein the callback function is configured to:
   write the compressed raw bits to a page of memory of the computer storage; and
   when the page of memory of the computer storage is full, write the compressed raw bits to a codec-encoded file.

7. The electronic device of claim 6, wherein the codec-encoded file comprises an SPX file.

8. The electronic device of claim 1, comprising a microphone.

9. The electronic device of claim 1, comprising a cellular telephone.

10. One or more tangible, non-transitory, computer readable media, comprising instructions configured to cause a processor to:
    receive content from a content capture device, wherein the content capture device comprises machine-readable storage media and a content queue, the content queue comprising:
       a buffer queue comprising two or more buffers, each of the two or more buffers configured to store a portion of raw bits of the content and
       a callback function, configured to perform codec-encoding of raw bits of the content stored in one of the two or more buffers into codec-encoded portions of the content and write the codec-encoded portions of the content to the machine-readable storage media;
    store a first portion of the raw bits of the content in a first buffer;
    when the first buffer is full, provide the first buffer as input to the callback function,
    upon receiving the first buffer at the callback function, codec-encode, via the callback function, the first portion of the raw bits of the content into a first portion of codec-encoded bits of the codec-encoded content;
    while codec-encoding the first portion of the content, store a second portion of the raw bits of the content in a second buffer;
    when the second buffer is full, provide the second buffer as input to the callback function;
    upon receiving the second at the callback function, and after codec-encoding the first portion of the raw bits of the content, codec-encode the second portion of the raw bits of the content into a second portion of codec-encoded bits of the codec-encoded content;
    while codec-encoding the second portion of the raw bits of the content, store a third portion of the raw bits of the content in a buffer other than the second buffer; and
    upon completion of the codec-encoding of the second portion of the raw bits of the content, append the second portion of the codec-encoded bits of the codec-encoded content to the first portion of the codec-encoded bits of the codec-encoded content.

11. The one or more tangible, non-transitory, computer readable media of claim 10, wherein the content comprises audio and the content capture device comprises a microphone.

12. The one or more tangible, non-transitory, computer readable media of claim 10, wherein the instructions configured to cause the processor to codec-encode the first portion of the raw bits of the content comprises providing the first portion of the raw bits of the content to a callback function that codec-encodes the first portion of the raw bits of the content;
   wherein upon completion of codec-encoding the first portion of the raw bits of the content, the first buffer is returned to the buffer queue for subsequent re-filling.

13. The one or more tangible, non-transitory, computer readable media of claim 10, comprising instructions configured to cause the callback function to:
   generate a codec file header that indicates at least one codec compression setting;
   compress the first and second portion of the raw bits of the content according to the at least one codec compression setting; and
   append the compressed first and second portion of the raw bits of the content to the machine-readable storage medium.

14. The one or more tangible, non-transitory, computer readable media of claim 10, comprising instructions configured to cause the callback function to:
   upon completion of compression of the first portion of the raw bits of the content, return the first buffer to the buffer queue for subsequent filling of additional portions of content.

15. The one or more tangible, non-transitory, computer readable media of claim 10, comprising instructions configured to remove the first buffer from the buffer queue when the first buffer is determined to be full.

16. A computer-implemented method, comprising:
   receiving, via a processor, a first portion of raw bits of audio input data into a first buffer of a buffer queue, wherein the buffer queue comprises two or more buffers, each of the two or more buffers are configured to store a portion of the raw bits of audio input data;
   when the first buffer is full:
      removing the first buffer from the buffer queue;
      start receiving subsequent portions of the raw bits of the audio input data into a second buffer of the buffer queue;
      providing the first portion of the raw bits of the audio input data in the first buffer to a callback function that codec-encodes the first portion of the raw bits of the audio input data in the first buffer; and
      writing the codec-encoded first portion of the raw bits of the audio input data to computer storage; and
   once the codec-encoded first portion of the raw bits of the audio input data is written to the computer storage:
      returning the first buffer from the callback function to the end of the buffer queue for subsequent re-filling; and
   when the second buffer is full:
      providing the second portion of the raw bits of the audio input data in the second buffer to the callback function that codec-encodes the second portion of the raw bits of the audio input data in the second buffer, such that upon receipt of the second portion of raw bits and after the call-back function codec-encodes the first portion of the raw bits, the callback function codec-encodes the second portion of the raw bits into a second portion of codec-encoded bits of the codec-encoded content; and
      receiving and storing a third portion of the raw bits of the audio input data in a buffer other than the second buffer while the second portion of the raw bits is being codec-encoded; and
      upon completion of codec-encoding of the second portion of the raw bits, appending the second portion of the codec-encoded bits to the first portion of the codec-encoded bits of the codec-encoded content.

17. The computer-implemented method of claim 16, comprising: in the callback function:
   receiving the first portion of the raw bits of the audio input data;
   compressing the first portion of the raw bits of the audio input data according to a codec;
   writing the compressed first portion of the audio input data to a page of memory; and
   when the page of memory is full, writing the page of memory to a codec-encoded file.

18. The computer-implemented method of claim 17, wherein the codec comprises speex codec.

19. The computer-implemented method of claim 16, wherein the audio input data is received from a microphone of an electronic device.

\* \* \* \* \*

UNITED STATES PATENT AND TRADEMARK OFFICE
CERTIFICATE OF CORRECTION

PATENT NO. : 10,008,215 B1
APPLICATION NO. : 15/364823
DATED : June 26, 2018
INVENTOR(S) : LaClair et al.

Page 1 of 1

It is certified that error appears in the above-identified patent and that said Letters Patent is hereby corrected as shown below:

On the Title Page

1. Under item "Notice", Line 3, delete "0 days. days." and insert -- 0 days. --, therefor.

In the Specification

2. In Column 1, Line 46, delete "DRAWINGS" and insert -- BRIEF DESCRIPTION OF DRAWINGS --, therefor.

3. In Column 3, Line 8, delete "an Speex" and insert -- a Speex --, therefor.

4. In Column 4, Line 58, delete "increase" and insert -- increased --, therefor.

In the Claims

5. In Column 5, Line 34, in Claim 1, delete "second at" and insert -- second buffer at --, therefor.

6. In Column 6, Line 32, in Claim 10, delete "content and" and insert -- content; and --, therefor.

7. In Column 6, Line 41, in Claim 10, delete "function," and insert -- function; --, therefor.

8. In Column 6, Line 51, in Claim 10, delete "second at" and insert -- second buffer at --, therefor.

Signed and Sealed this
Sixteenth Day of April, 2019

Andrei Iancu
*Director of the United States Patent and Trademark Office*